US005914794A

United States Patent [19]
Fee et al.

[11] Patent Number: 5,914,794
[45] Date of Patent: Jun. 22, 1999

[54] METHOD OF AND APPARATUS FOR DETECTING AND REPORTING FAULTS IN AN ALL-OPTICAL COMMUNICATIONS SYSTEM

[75] Inventors: John A. Fee, Plano; Laszlo I. Szerenyi, Dallas, both of Tex.

[73] Assignee: MCI Communications Corporation, Washington, D.C.

[21] Appl. No.: 08/775,160

[22] Filed: Dec. 31, 1996

[51] Int. Cl.⁶ .................................................. H04B 10/02
[52] U.S. Cl. ......................... 359/110; 359/341; 359/174; 370/243
[58] Field of Search ..................................... 359/110, 341, 359/124, 173, 174, 177, 179, 134, 160; 385/24, 15; 372/6; 370/223, 227–8, 243, 247–8

[56] References Cited

U.S. PATENT DOCUMENTS

| | | | |
|---|---|---|---|
| 4,451,916 | 5/1984 | Casper et al. .............................. | 370/16 |
| 5,329,392 | 7/1994 | Cohen ..................................... | 359/124 |
| 5,440,418 | 8/1995 | Ishimura et al. ......................... | 359/177 |
| 5,457,556 | 10/1995 | Shiragaki ................................ | 359/117 |
| 5,500,756 | 3/1996 | Tsushima et al. ................... | 359/110 X |
| 5,532,864 | 7/1996 | Alexander et al. ................. | 359/110 X |
| 5,555,477 | 9/1996 | Tomooka et al. ....................... | 359/115 |

OTHER PUBLICATIONS

John A. Fee and Laszlo I. Szerenyi, *EDFA Applications in the Terrestrial Network and Future Directions*, OSA TOPS on Optical Amplifiers and Their Applications, 1996, vol. 5, Optical Society of America, pp. 289–297.

*Primary Examiner*—Thomas Mullen

[57] ABSTRACT

A method of and system for detecting and reporting faults in an all-optical communications system. The system monitors each of the optical fibers and uses the optical supervisory channel system to detect and report faults. Whenever the system detects a fault in any of optical fibers, the system forms a message identifying the fault and transmits the message in the optical supervisory channel carried by at least one of the optical fibers.

27 Claims, 3 Drawing Sheets

METHOD OF AND APPARATUS FOR DETECTING AND REPORTING FAULTS IN AN ALL-OPTICAL COMMUNICATIONS SYSTEM

FIELD OF THE INVENTION

The present invention relates generally to communications system operation and management, and more particularly to a method of and system for detecting and reporting faults in an all-optical communications system.

DESCRIPTION OF THE PRIOR ART

Optical fiber systems have become the physical transport medium of choice in long distance telephone and data communication networks. The original optical fiber systems included, in addition to a light transmitter and a light receiver connected by optical fiber, repeaters at various points along the optical fiber. Repeaters are optical-electrical devices that include a receiver and a transmitter in series with circuitry for reshaping and retiming the signal. The receiver part of the repeater converts the signal on the optical fiber from the optical domain to the electrical domain, and the transmitter converts the signal from the electrical domain back to the optical domain. The retiming and reshaping circuitry processes the signal in the electrical domain prior to retransmission.

Repeaters also include various fault detection circuitry. Whenever the fault detection circuitry of a repeater detects a loss of signal, which may be caused by a break in the fiber, the repeater generates an alarm indication signal (AIS), which is passed downstream from repeater to repeater to a controller. The controller can identify the repeater that originated the AIS and thereby determine the approximate location of the fiber break.

Recently, optical network operators have proposed and have begun to introduce "all-optical" systems. An all-optical system does not include electro-optical repeaters. Rather, all-optical systems use optical amplifiers, such as rare earth-doped fiber amplifiers, to amplify the optical signals along the route. Rare earth-doped fiber amplifiers are effective in an amplification region, which is a band of wavelengths. For example, erbium-doped fiber amplifiers are effective in an amplification region from about 1530 nanometers (nm) to about 1565 nm.

All-optical systems may also use wavelength division multiplexing to increase bandwidth. In an optical wavelength division multiplexing system, optical signals with several carrier wavelengths, separated by a relatively small wavelength separation, are transmitted on the same optical fiber. Each carrier is individually modulated and carries different information. For example, optical channels may be set up around a wavelength of 1550 nm.

There has been proposed including on the optical fiber of all-optical systems an optical supervisory channel for the transmission of management, performance, signalling, and other overhead information. In order to make the full amplification region available for traffic, the optical supervisory channel may occupy wavelength band outside the traffic band. For example, in a system with erbium-doped fiber amplifiers, the wavelength for the optical supervisory channel may be about 1510 nm, which is outside the amplification region for erbium-doped fiber amplifiers but within the low fiber loss region for silica fibers.

A shortcoming of all-optical systems is in the area of fault detection and reporting. Since an all-optical system does not include electro-optical repeaters, there is no means for generating an alarm indication signal in the event of a loss of signal. Lost signals are detected at the optical cross-connect controller at the end of a fiber leg, but it is impossible to tell where the fiber was cut.

Accordingly, it is an object of the present invention to provide a method of and system for detecting and reporting faults in an all-optical communication system.

SUMMARY OF THE INVENTION

The present invention provides a method of and system for detecting and reporting faults in an all-optical communications system. An all-optical communications system includes a plurality of optical fibers and a plurality of optical amplifiers. Each of the optical fibers may be adapted to carry a plurality of wavelength division multiplexed traffic channels in a traffic band and an optical supervisory channel.

Briefly stated, the system of the present invention monitors each of the optical fibers and uses the optical supervisory channel system to detect and report faults. Whenever the system detects a fault in any of optical fibers, the system forms a message identifying the fault and transmits the message in the optical supervisory channel carried by at least one of the optical fibers. Preferably, in order to increase fault tolerance, the system transmits the message in the optical supervisory channels of all of the optical fibers.

In one of its aspects, the system of the present invention monitors the optical fibers by separating the optical supervisory channel from the traffic channels in at least one of the optical fibers. The system then converts the separated optical supervisory channel from an optical signal to an electrical signal and detects a fault in the electrical signal. In another of its aspects, the system monitors the fibers for faults by forming a split beam upstream of one of the optical amplifiers and measuring the optical power of the split beam. The system of the present invention may also monitor the optical amplifiers for malfunctions.

The system of the present invention forms a message identifying a fault or amplifier malfunction by generating an electrical signal containing the message. The system transmits the message in the optical supervisory channel by converting the electrical signal containing the message to an optical signal and coupling the converted signal to an optical fiber downstream of an optical amplifier.

The system of the present invention is preferably implemented in a local area network (LAN) environment, although other architectures may also be used. A line supervisory module is associated with at least one of the optical amplifiers. Each line supervisory module includes a filter for separating the upstream optical supervisory channel from the traffic channels. A receiver is connected to the filter to convert the optical supervisory channel from an optical signal to an electrical signal. A controller that includes means for detecting a fault in the electrical signal is connected to the receiver. The controller also includes means for processing various data. In a LAN environment, the controller is connected to the LAN by means of a suitable interface. A transmitter for converting data from an electrical signal to an optical signal in the wavelength of the optical supervisory channel is connected to the controller. The line supervisory module includes a coupler connected to the transmitter and positioned in the downstream leg of the optical fiber. The line supervisory module may also be connected to receive malfunction indications from its associated optical amplifier.

An element manager is connected to the local area network in communication with each of the line supervisory modules. The element manager receives fault and malfunction indications from the line supervisory modules and processes the indications to form messages identifying the faults or malfunctions. The element manager sends the messages to line supervisory modules for transmission on the optical supervisory channel.

The system may also include fault detectors associated with at least some of the optical amplifiers. Each fault detector includes a beam splitter upstream of the associated amplifier and means for measuring optical power. The fault detector measures the optical power of the entire split beam, thereby to detect fiber breaks, and receives amplifier malfunction indications. Each fault detector is in communication with the element manager. The element manager periodically polls each fault detector to determine the fault status of the optical fiber and amplifier monitored by the fault detector. When a fault detector detects a fault or malfunction, the element manager forms an appropriate message. The element manager sends the message to the line supervisory modules for transmission on the optical supervisory channel.

DESCRIPTION OF THE PREFERRED EMBODIMENT

Figure 1:
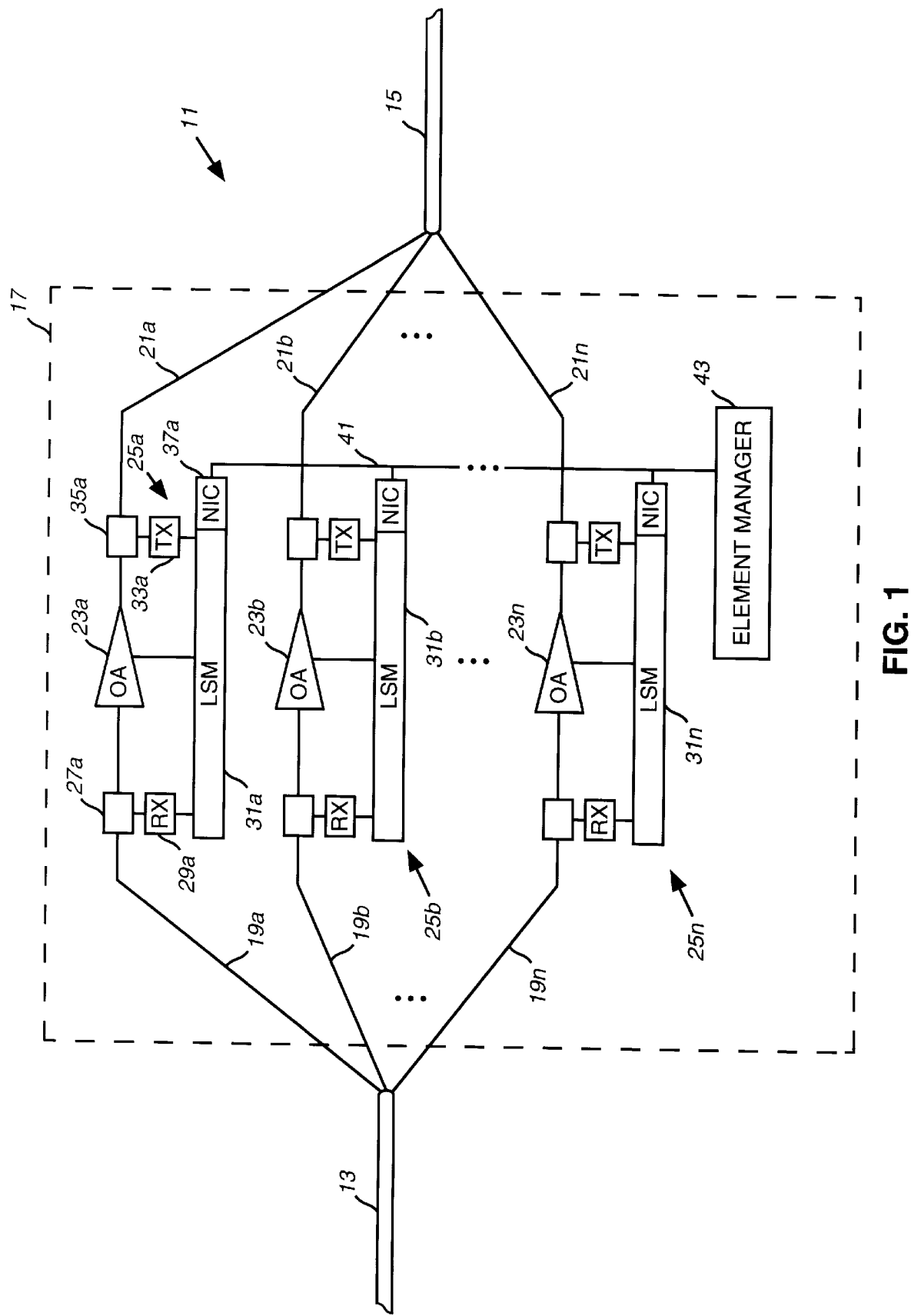
FIG. 1 is a block diagram of a preferred embodiment of the present invention.

Referring now to the drawings, and first to FIG. 1, a portion of an all-optical communications system is designated generally by the numeral 11. Communications system 11 includes an inbound optical cable 13 and an outbound optical cable 15. Each optical cable 13 and 15 comprises a plurality of optical fibers. Preferably, each optical fiber in communications system 11 may carry a plurality of wavelength division multiplexed traffic channels in an amplification band, for example from about 1530 nm to about 1565 nm. Each optical fiber also carries an optical supervisory channel that preferably occupies a wavelength outside the traffic band at, for example, about 1510 nm. The traffic channels carry customer traffic and the optical supervisory channel carries system administration, signaling, and other overhead traffic. Those skilled in the art will recognize that the optical supervisory channel may be carried in the traffic band and that other wavelength bands may be used. Thus, a traffic band from about 1530 nm to about 1565 nm, and an out-of-band optical supervisory channel at about 1510 nm is disclosed for purposes of illustration and not for limitation.

Communications system 11 also includes an amplification station 17. At amplification station 17, the optical fibers of cables 13 and 15 are separated and their signals are amplified. More specifically, the optical fibers of inbound cable 13 are separated into individual optical fibers 19a–19n and the optical fibers of outbound cable 15 are separated into individual optical fibers 21a–21n. The inbound and outbound fibers are connected together and amplified by means of optical amplifiers 23a–23n, which in the preferred embodiment are erbium-doped fiber amplifiers.

Optical amplifiers 23 amplify the optical signals in the traffic band entirely in the optical domain without converting the signals to the electrical domain and back to the optical domain. However, optical amplifiers 23 may not amplify optical signals in the optical supervisory channel. In any event, an optoelectrical system designated generally by the numeral 25 is provided for processing signals in the optical supervisory channel.

Each optoelectrical system 25 includes an optical filter 27 in its associated inbound optical fiber 19. Optical filter 27 passes the traffic channels to optical amplifier 23 and separates out the optical supervisory channel. The separated optical supervisory channel signals are passed in the optical domain to a receiver 29, which detects the signals and converts them to the electrical domain. Receiver 29 passes the electrical signals to a line supervisory module 31, which performs some signal processing and passes the electrical signals to a transmitter 33. Transmitter 33 converts the electrical signals back to the optical domain and passes the optical signals to an optical coupler 35 in outbound optical fiber 21 to rejoin the traffic channels.

Optical amplifiers 23 include instrumentation for measuring various amplifier performance metrics. For example, each optical amplifier 23 can detect conditions such as pump laser failure, output power failure, excessive pump laser temperature, and the like. Accordingly, each optical amplifier 23 is connected to its associated line supervisory module 31 and line supervisory module 31 is adapted to receive and process amplifier performance metrics.

According to the present invention, each line supervisory module 31 includes circuitry for monitoring and detecting faults in the signal received from receiver 29. For example, a break in optical fiber 19a will result in a loss of signal at receiver 29a. The loss of signal at receiver 29a is detected in line supervisory module 31a.

In the preferred embodiment, each line supervisory module 31 includes a network interface card 37, which connects the line supervisory module to a local area network. In the preferred embodiment, the local area network is implemented in an ethernet bus topology 41. However, those skilled in the art will recognize that other communications architectures are possible. Each line supervisory module 31 is connected to bus 41. Also connected to bus 41 is an element manager 43.

Element manager 43 receives fault and optical amplifier malfunction data from each of line supervisory modules 31a–31n. Whenever element manager 43 receives a fault or malfunction indication, it formulates an appropriate message identifying the type and location of the fault or malfunction. Element manager 43 sends a message to line supervisory modules 31a–31n over bus 41. The receiving line supervisory modules 31a–31n place the messages onto the optical supervisory channel of their associated outbound optical fiber 21. Accordingly, a fault detected in any inbound optical fiber 19 is reported on all of the outbound optical fibers 21. Thus, the system of the present invention provides communication system 11 with a robust and highly fault tolerant fault orthogonal ("bridge and ladder") detection and reporting system.

Figure 2:
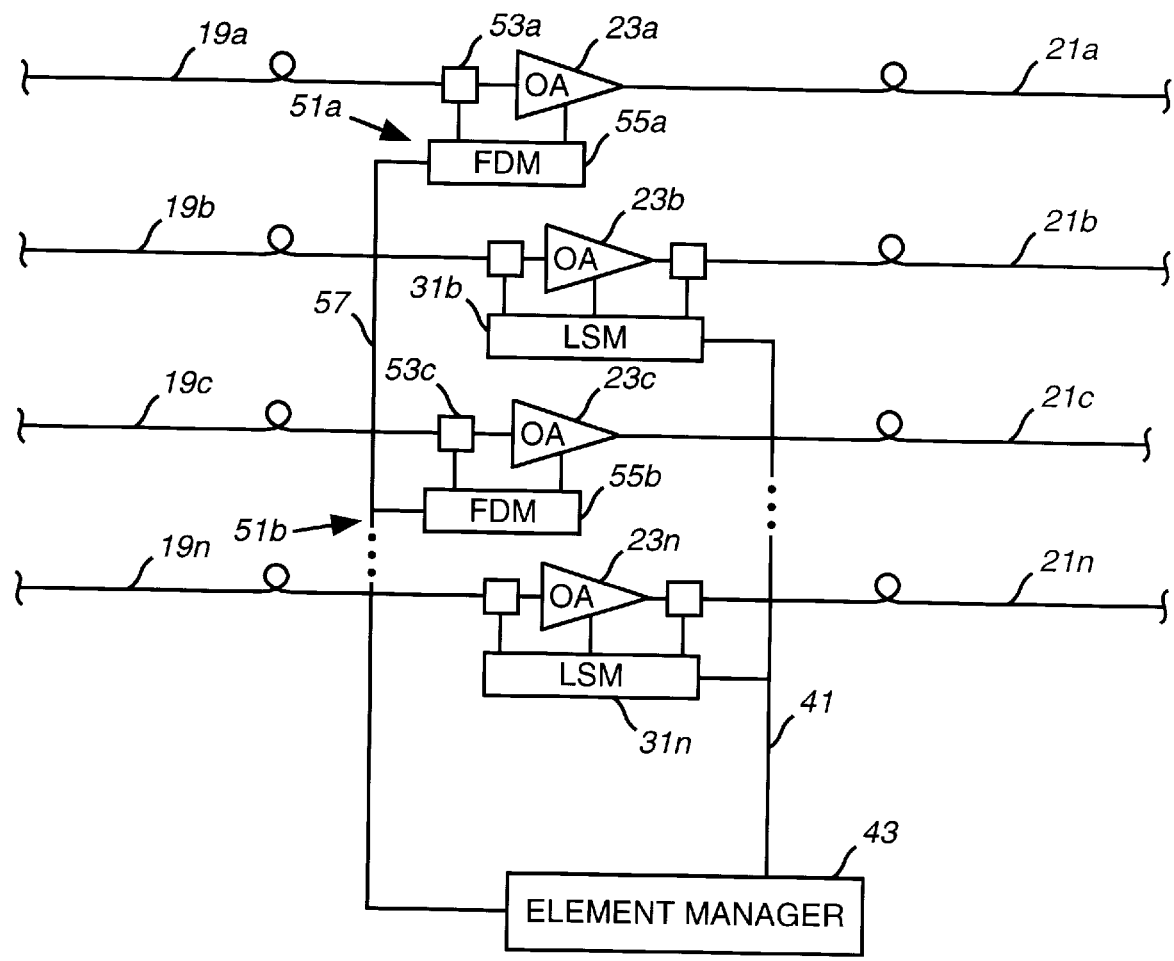
FIG. 2 is a block diagram of an alternative embodiment of the present invention.

Referring now to FIG. 2, there is shown an alternative embodiment of the system of the present invention. The system depicted in FIG. 2 comprises a plurality of line supervisory modules 31 that are connected to an element manager 43 by means of an ethernet bus 41, or other suitable local communications system. However, in the embodiment of FIG. 2, the line supervisory modules 31 are associated only with a selected subset of optical amplifiers 23.

Fault and amplifier malfunction detection for the remaining inbound optical fibers 19 not connected to a line supervisory module 31 is provided by a plurality of fault detectors, designated generally by the numeral 51. Each fault detector 51 includes a beam splitter 53 disposed in inbound optical fiber 19 upstream of optical amplifier 23. Beam splitter 53 splits off a portion of the entire beam carried by its associated inbound optical fiber 19 and passes the remainder of the beam on to its associated optical amplifier 23 for amplification.

The split beam is passed to a fault detection module 55 that is adapted simply to measure optical power received from beam splitter 53. Fault detection module 55 is also connected to receive amplifier malfunction indications from its associated optical amplifier 23. Each fault detection module 55 is connected by means of a suitable connection 57 to element manager 43. Whenever the optical power received at a fault detection module 55 is below a preselected threshold or its associated optical amplifier indicates a malfunction, the fault detection module 55 registers a fault or a malfunction.

Fault detection modules 55 report faults to element manager 43. For example, fault detection modules 55 may be addressable and element manager 43 may periodically poll each fault detection module 55 to determine its fault and malfunction status. Whenever element manager 43 receives a fault or malfunction indication from a fault detection module 55, it transmits an appropriate message to line supervisory modules 31 for transmission on their associated optical supervisory channels. The embodiment of FIG. 2 thus provides a moderately robust and fault tolerant orthogonal bridge and ladder system for detecting and reporting faults, but it is less expensive than the embodiment of FIG. 1.

Figure 3:
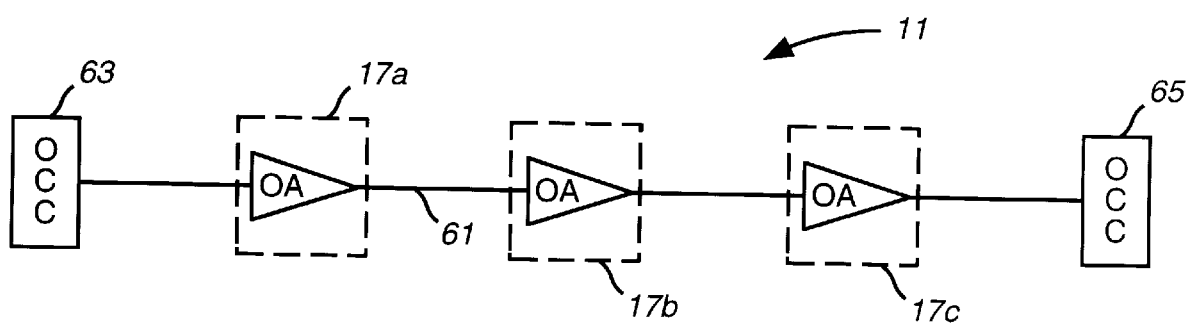
FIG. 3 is a block diagram showing an all-optical communications system including the system of the present invention.

The orthogonal bridge and ladder system for detecting and reporting faults of the present invention may be better understood with reference to FIG. 3, in which an all-optical communications system is generally designated by the numeral 11. System 11 includes an optical cable 61 between a first optical cross connect controller 63 and a second optical cross connect controller 65. Optical cable 61 comprises a plurality of optical fibers, as illustrated in FIGS. 1 and 2.

System 11 also includes a plurality of amplification stations 17a–17c disposed at selected locations along the route of optical cable 61. Each of amplification stations 17a–17c is like the ones disclosed in FIGS. 1 or 2. Thus, referring to FIGS. 1 and 2, each amplification station 17a–17c includes an optical amplifier 23 associated with each optical fiber, a local area network bus 41, an element manager 43, and either a line supervisory module 25 or a fault detection module 51 associated with each optical amplifier 23.

Referring again to FIG. 3, if a break occurs in any or even all of the fibers of optical cable 61 between, for example, first optical cross connect controller 63 and amplification station 17a, the lost signal or signals will be detected at one or more of the line supervisory modules at station 17a. The element manager at station 17a will form a message identifying the nature and location of the fault and pass that message to each of the line supervisory modules at station 17a for transmission on their associated optical supervisory channels.

Likewise, if a break occurs in any or even all of the fibers of optical cable 61 between, for example, amplification station 17a and amplification station 17b, the lost signal or signals will be detected at one or more of the line supervisory modules at station 17b. The element manager at station 17b will form a message identifying the nature and location of the fault and pass that message to each of the line supervisory modules at station 17b for transmission on their associated optical supervisory channels. Thus, if even a single optical fiber connects optical cross connect controllers 61 and 65, all fault information for system 11 will reach optical cross connect controller 65.

From the foregoing, those skilled in the art will recognize that the method and system of the present invention are well adapted to overcome the shortcomings of the prior art. The present invention provides a method and system for detecting and reporting faults in an all-optical communications system. Moreover, the system is highly fault tolerant in that it can handle multiple failures at multiple points along the optical route. Also, those skilled in the art will recognize that the present invention may be implemented in a bidirectional system, and thereby provide additional redundancy.

While the present invention has been illustrated and described with reference to preferred embodiments, those skilled in the art will recognize that the present invention may be implemented in other environments and that certain features of the invention may be implemented independently of other features. Accordingly, the spirit and scope of the invention may be determined with reference to the appended claims.

What is claimed is:

1. A method of detecting and reporting faults in an all-optical communications system that includes a plurality of optical fibers and a plurality of optical amplifiers, each of said optical fibers being adapted to carry a plurality of wavelength division multiplexed traffic channels and an optical supervisory channel, which comprises the steps of:

detecting a fault in one of said optical fibers;

forming a message identifying said fault; and, transmitting said message in the optical supervisory channel carried by at least one of said optical fibers.

2. The method as claimed in claim 1, including the step of transmitting said message in the optical supervisory channel carried by each of said optical fibers.

3. The method as claimed in claim 1, wherein said step of detecting a fault in one of said fibers includes the steps of:

separating said optical supervisory channel from said traffic channels in said one fiber upstream of one optical amplifier;

converting said separated optical supervisory channel from an optical signal to an electrical signal; and detecting a fault in said electrical signal.

4. The method as claimed in claim 3, wherein said step of forming a message identifying said fault includes the step generating an electrical signal containing said message identifying said fault.

5. The method as claimed in claim 4, wherein said step of transmitting said message in the optical supervisory channel carried by at least one of said optical fibers includes the steps of:

converting said electrical signal containing said message to an optical signal;

coupling said optical signal to said optical fiber downstream of said one optical amplifier.

6. The method as claimed in claim 1, wherein said step of detecting a fault in one of said fibers includes the steps of:

forming a split beam upstream of one of said optical amplifiers; and, measuring the optical power of said split beam.

7. The method as claimed in claim 1, including the steps of:

detecting a malfunction in one of said optical amplifiers;

forming a message identifying said malfunction;

transmitting said message identifying said malfunction in the optical supervisory channel carried by at least one of said fibers.

8. A method of detecting and reporting faults in an all-optical communications system that includes a plurality of optical fibers and a plurality of optical amplifiers, each of said optical fibers being adapted to carry a plurality of wavelength division multiplexed traffic channels and an optical supervisory channel, which comprises the steps of:

monitoring each of said optical fibers for faults;

in response to detection of a fault in any of said optical fibers, forming a message identifying said fault; and, transmitting said message in the optical supervisory channel carried by at least one of said optical fibers.

9. The method as claimed in claim 8, including the step of transmitting said message in the optical supervisory channel carried by each of said optical fibers.

10. The method as claimed in claim 8, wherein said step of monitoring each of said fibers for faults includes the steps of:

separating said optical supervisory channel from said traffic channels in at least one of said optical fibers;

converting said separated optical supervisory channel from an optical signal to an electrical signal; and, detecting a fault in said electrical signal.

11. The method as claimed in claim 8, wherein said step of monitoring each of said fibers for faults includes the steps of:

forming a split beam upstream of one of said optical amplifiers; and, measuring the optical power of said split beam.

12. The method as claimed in claim 8, wherein said step of forming a message identifying said fault includes the step of generating an electrical signal containing said message identifying said fault.

13. The method as claimed in claim 12, wherein said step of transmitting said message in the optical supervisory channel carried by at least one of said optical fibers includes the step of converting said electrical signal containing said message to an optical signal.

14. The method as claimed in claim 8, wherein said all-optical communications system includes N optical fibers and said step of monitoring each of said optical fibers for faults includes the steps of:

separating said optical supervisory channel from said traffic channels in m of said fibers, where m is an integer greater than zero and equal to or less than N;

converting said each separated optical supervisory channel from an optical signal to an electrical signal; and, detecting a fault in any of said electrical signals;

forming a split beam in N−m of said optical fibers; and, measuring the optical power of each of said split beams.

15. The method as claimed in claim 8, including the steps of:

monitoring at least some of said optical amplifiers for malfunctions;

in response to detecting a malfunction in a monitored optical amplifier, forming a message identifying said malfunction;

transmitting said message identifying said malfunction in the optical supervisory channel carried by at least one of said fibers.

16. A system for detecting and reporting faults in an all-optical communications system that includes a plurality of optical fibers and a plurality of optical amplifiers, each of said optical fibers being adapted to carry a plurality of wavelength division multiplexed traffic channels and an optical supervisory channel, which comprises:

means for monitoring each of said optical fibers for faults;

means, responsive to detection of a fault in any of said optical fibers, for forming a message identifying said fault; and, means for transmitting said message in the optical supervisory channel carried by at least one of said optical fibers.

17. The system as claimed in claim 16, including means for transmitting said message in the optical supervisory channel carried by each of said optical fibers.

18. The system as claimed in claim 16, wherein said means for monitoring each of said fibers for faults includes:

means for separating said optical supervisory channel from said traffic channels in at least one of said optical fibers;

means for converting said separated optical supervisory channel from an optical signal to an electrical signal; and, means for detecting a fault in said electrical signal.

19. The system as claimed in claim 16, wherein said means for monitoring each of said fibers for faults includes:

means for forming a split beam in at least one of said optical fibers; and, means for measuring the optical power of said split beam.

20. The system as claimed in claim 16, wherein said means for forming a message identifying said fault includes means for generating an electrical signal containing said message identifying said fault.

21. The system as claimed in claim 20, wherein said means for transmitting said message in the optical supervisory channel carried by at least one of said optical fibers includes means for converting said electrical signal containing said message to an optical signal.

22. The system as claimed in claim 16, wherein said all-optical communications system includes N optical fibers and said means for monitoring each of said optical fibers for faults includes:

means for separating said optical supervisory channel from said traffic channels in m of said fibers, where m is an integer greater than zero and equal to or less than N;

means for converting said each separated optical supervisory channels from an optical signal to an electrical signal;

means for detecting a fault in any of said electrical signals;

means for forming a split beam in N −m of said optical fibers; and, means for measuring the optical power of each of said split beams.

23. The system as claimed in claim 16, further comprising:

means for monitoring at least some of said optical amplifiers for malfunctions;

means, responsive to detecting a malfunction in a monitored optical amplifier, for forming a message identifying said malfunction; and means for transmitting said message identifying said malfunction in the optical supervisory channel carried by at least one of said fibers.

24. A system for detecting and reporting faults in an all-optical communications system that includes a plurality of optical fibers and a plurality of optical amplifiers, each of said optical fibers being adapted to carry a plurality of wavelength division multiplexed traffic channels and an optical supervisory channel, said system comprising:

a local area network;

a line supervisory module associated with at least one of said optical amplifiers, each line supervisory module including:

a filter in the optical fiber upstream of the associated optical amplifier for separating said optical supervisory channel from said traffic channels;

a receiver for converting the optical supervisory channel from an optical signal to an electrical signal;

a controller connected to said receiver, said controller including means for detecting a fault in said electrical signal;

an interface for connecting said controller to said local area network;

a transmitter for converting data from an electrical signal to an optical signal in the wavelength of said optical supervisory channel; and, a coupler in said optical fiber downstream of said optical amplifier for placing said converted signal onto the optical supervisory channel of said optical fiber;

an element manager connected to said local area network, said element manager including means for processing detected faults, forming messages identifying said faults, transmitting said messages to said line supervisory modules.

25. The system as claimed in claim 24, including a plurality of line supervisory modules associated with at least some of said optical amplifiers.

26. The system as claimed in claim 24, further comprising:

a fault detector associated with at least one of said optical amplifiers, said fault detector including:

a beam splitter upstream of the associated amplifier; and, means for measuring optical power;

and means for establishing communication between said fault detector and said element manager.

27. A system for detecting and reporting faults in an all-optical communications system that includes an optical cable including a plurality of optical fibers and a plurality of amplification stations located at spaced apart points along said optical cable, each of said amplification stations including a plurality of optical amplifiers, each of said optical fibers being adapted to carry at least one wavelength division multiplexed traffic channel and an optical supervisory channel, said system for detecting and reporting faults comprising:

a local area network at each of said amplification stations;

a line supervisory module connected to said local area network and associated with at least one of said optical amplifiers at each of said amplification stations, each line supervisory module including means for separating said optical supervisory channel from said traffic channel, means for converting the separated optical supervisory channel from an optical signal to an electrical signal, means for detecting a fault in said electrical signal, means for converting data from an electrical signal to an optical signal in the wavelength of said optical supervisory channel, and means for placing said converted signal onto the optical supervisory channel of an optical fiber; and, an element manager connected to said local area network at each of said amplification stations, said element manager including means for processing faults detected by said line supervisory modules, forming messages identifying the nature and location of said faults, and transmitting said messages to said line supervisory modules, whereby a fault detected at any one of said amplification stations in said all-optical communications system is reported on each of said fibers connected served by a line supervisory module.

* * * * *